United States Patent [19]

Galster et al.

[11] Patent Number: 4,527,477
[45] Date of Patent: Jul. 9, 1985

[54] INK METERING DEVICE

[75] Inventors: Hans-Peter Galster, Seligenstadt; Janko Despot, Offenbach am Main, both of Fed. Rep. of Germany

[73] Assignee: M.A.N.-Roland Druckmaschinen Aktiengesellschaft, Fed. Rep. of Germany

[21] Appl. No.: 543,407

[22] Filed: Oct. 19, 1983

Related U.S. Application Data

[63] Continuation-in-part of Ser. No. 472,595, Mar. 7, 1983, abandoned.

[30] Foreign Application Priority Data

Mar. 26, 1982 [DE] Fed. Rep. of Germany ....... 3211156

[51] Int. Cl.³ .................. B41F 31/00; B41F 31/02; B41F 31/04
[52] U.S. Cl. .................. 101/365; 101/DIG. 26
[58] Field of Search .................. 101/365, DIG. 26

[56] References Cited

U.S. PATENT DOCUMENTS

| | | | |
|---|---|---|---|
| 3,057,294 | 10/1962 | Jameson | 101/365 |
| 3,242,452 | 3/1966 | Grunwald et al. | 338/174 |
| 3,727,550 | 4/1973 | Easoz et al. | 101/365 |
| 3,747,524 | 7/1973 | Crum | 101/365 |
| 3,978,788 | 9/1976 | Cappel et al. | 101/365 |
| 4,058,058 | 11/1977 | Hantscho | 101/365 |
| 4,193,345 | 3/1980 | Schoneberger | 101/365 |
| 4,328,748 | 5/1982 | Schramm | 101/365 |
| 4,329,923 | 5/1982 | Iida | 101/365 |
| 4,372,207 | 2/1983 | Toyoda | 101/365 |
| 4,385,560 | 5/1983 | Johne et al. | 101/365 |

Primary Examiner—Clyde I. Coughenour
Assistant Examiner—William L. Klima
Attorney, Agent, or Firm—Leydig, Voit, Osann, Mayer & Holt, Ltd.

[57] ABSTRACT

An ink metering arrangement for a printing press including a fountain roller having a plurality of slides arranged edge-to-edge in respective column positions, each slide being adjustable so that its tip forms a gap with the roller thereby determining the rate of ink flow in the corresponding column position. Each slide has a reversible motor for driving the slide over a limited range of movement with respect to a slide reference position. A potentiometer is connected to the motor for producing an electrical output signal corresponding to the degree of slide displacement, the potentiometer having a stop to establish a reference output condition. A slip clutch is interposed in at least one of the motor connections so that when the motor is energized in a first direction the potentiometer and slide are both driven to their reference positions accompanied by relative slipping movement of the clutch notwithstanding the fact that the tip of the slide may have been shortened by wear against the roller. Upon reversal of the motor the potentiometer thereafter provides an accurate measure of the opening at the gap.

9 Claims, 5 Drawing Figures

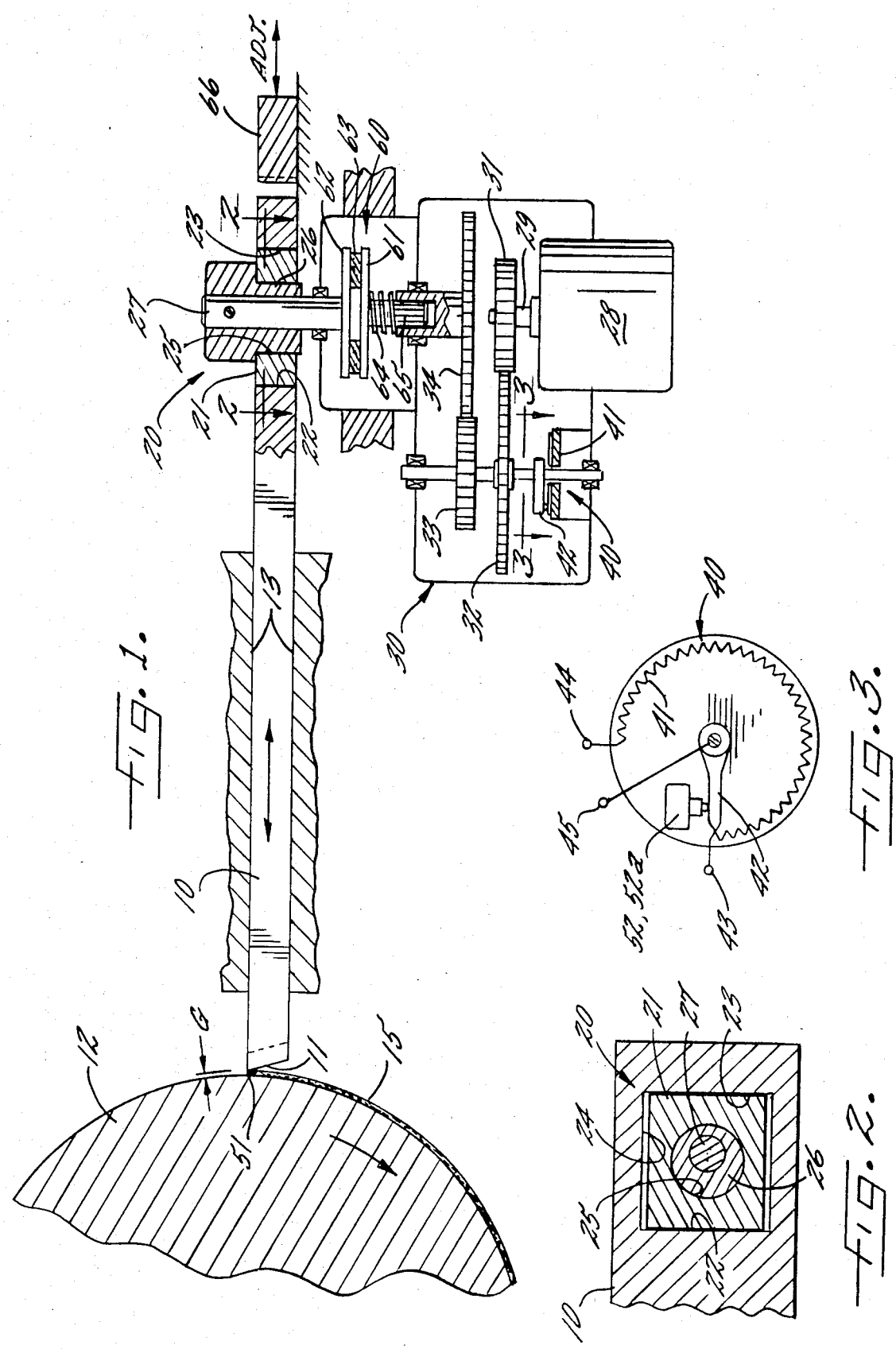

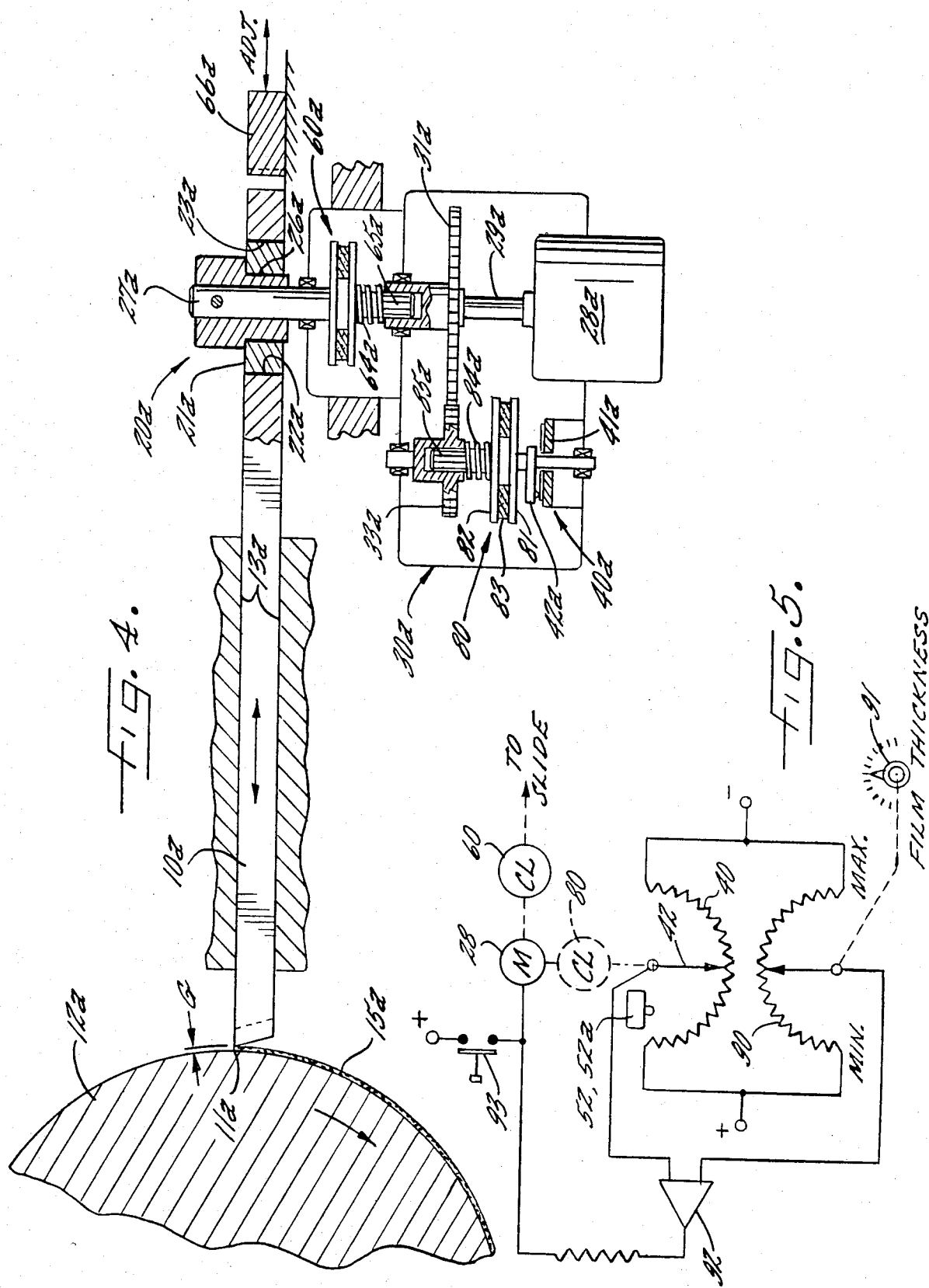

INK METERING DEVICE

DESCRIPTION OF THE INVENTION

This application is a continuation-in-part of application Ser. No. 472,595, abandoned, filed Mar. 7, 1983.

It is known to drive an ink slide by an individual motor back and forth through a limited range in order to vary the gap between the slide and fountain roller to establish the rate of ink flow in the particular column position. This is shown, for example, in U.S. Pat. No. 3,978,788, which issued Sept. 7, 1976. The motor is coupled to a variable resistor to provide remote indication of the existing gap. However, due to the fact that wear occurs at the tip of the slide when the slide is in contact with the roller, to produce zero ink flow at a particular column position, the slide and variable resistor get out of synchronism so that the resistance is no longer an accurate measure of the gap. In such event the ink fountain must be dismantled and the calibration re-established. This work is time consuming and consequently expensive because of both the cost of labor and the loss of production.

It is, accordingly, an object of the present invention to provide an ink fountain having a plurality of slides for feeding ink in respective column positions in which the position of each slide is constantly measured by a displacement sensing device which provides an accurate indication of the gap which determines the rate of ink feed and in which the rate of ink feed may be accurately established independently of the degree of wear occuring over a period of time at the tip of the slide. It is a more specific object to provide an assembly for adjusting an ink slide to feed ink at a desired rate in a particular column position which is automatically set to a recalibrated state at each usage without care or attention on the part of the operator and which therefore retains its original calibration over the life of the fountain.

It is a related object to provide an arrangement for adjusting the slides of an ink fountain in which the slide settings and rates of ink flow in the respective column positions are accurately reproducible independently of wear at the tips of the respective slides over the life of the press and regardless of whether the wear occurs evenly or unevenly.

Other objects and advantages of the invention will become apparent by reading the attached detailed description and upon reference to the drawings in which:

FIG. 1 is a fragmentary elevation showing a slide and portion of a cooperating fountain roller together with a driving assembly for adjusting the slide back and forth through its range of adjusting movement;

FIG. 2 is a fragmentary plan view looking along line 2—2 in FIG. 1;

FIG. 3 is a fragmentary plan view of the potentiometer looking along line 3—3 in FIG. 1;

FIG. 4 is a view similar to FIG. 1 showing a modified construction with a slip clutch interposed in each of the drive connections; and FIG. 5 is a simplified form of control circuit for the motor shown in FIG. 1.

While the invention has been described in connection with certain preferred embodiments, it will be understood that we do not intend to be limited to the particular embodiments shown but intend, on the contrary, to cover the various alternative and equivalent forms of the invention included within the spirit and scope of the appended claims.

Turning to FIG. 1 there is shown portions of a typical ink fountain including a slide 10 having a tip 11 which bears against the surface of the fountain roller 12. The slide is slidably accommodated between a pair of guides 13 for adjusting movement inwardly and outwardly in the direction of the arrow. This establishes a gap G so that ink, contained above the slide, is fed in a film 15 of predetermined thickness. As is well understood such film is transferred via a series of rollers and drums to a plate mounted upon a plate cylinder, with the image of the plate being finally "offset" upon a blanket cylinder for transfer to a sheet supported upon an impression cylinder. It will be understood that a plurality of slides 10 are arranged edge-to-edge in respective column positions, the slides, taken together, extending the length of the fountain roller and with each slide being independently adjustable by similar means. For details of the construction of the slides and the manner in which they are assembled in the ink fountain, reference is made to the above-mentioned U.S. patent.

For adjusting the slide 10 endwise a drive connection 20 is provided including a drive block 21 (see also FIG. 2) which is snugly fitted between opposed parallel edges 22, 23 of an opening 24 machined in the slide. A circular opening 25 is formed in the block 21 occupied by an eccentric 26 having a drive shaft 27. The shaft is driven by a gear motor 28 having a shaft 29 which constitutes the input element of a gear box 30. The gear train in the latter is formed of a set of four gears 31–34, the gear 34 being concentric with and coupled to the eccentric drive shaft 27. The gears 32, 33 are mounted upon a vertical cross shaft 35. Mounted at the lower end of this cross shaft is a potentiometer 40 having a resistance element 41 (see also FIG. 3) engaged by wiper 42, the resistance element having electrical connections 43, 44 and the wiper having a connection 45. In accordance with the present invention a slip clutch is interposed in at least one of the motor connections, (slide and potentiometer), so that when the motor is energized in a first direction both the potentiometer and the slide are fully moved to their respective reference positions accommodated by relative slipping movement of the clutch. The slide has a reference position 51 in which it is in contact with the surface of the fountain roller while the potentiometer has a reference position determined by stop 52 which is in the path of movement of the wiper 42. Thus, both the slide and the potentiometer are fully moved to the reference position prior to each slide adjustment notwithstanding the fact that the tip of the slide may have been relatively shortened by wear against the roller. Consequently, upon subsequent reversal of the motor to establish a desired gap G the potentiometer, thereafter, provides an accurate measure of the opening at the gap.

In the present instance, the slip clutch, indicated at 60, includes a first disc 61 and a second disc 62 with an annulus 63 of friction material interposed between them. The disc 61 is pressed in the direction of the disc 62 by a coil spring 64. Slight axial movement of the disc 61 is accommodated by a spline connection 65.

In operation, when the gear motor 28 is rotated in a first direction, the slide 10 and the potentiometer 40 are both simultaneously driven in the direction of their reference positions. The drive ratios are preferably such that slippage shall always occur at the clutch 60 for all conceivable amounts of wear at the tip of the slide 10. In other words, there is "over stroking" of the slide with respect to the potentiometer; that is to say, the slide 10 is advanced at such a rate that the tip of the slide is certain to strike the surface of the fountain roller before the wiper 42 engages the stop 52. The continued motor rotation required to insure "bottoming" of the wiper of the potentiometer upon its stop is accompanied by slippage at the clutch 60. Thus, regardless of whether the wear at the top of the slide 10 is zero or whether such wear is substantial, the slide will always be bottomed in its reference position upon the roller as the wiper 42 of the potentiometer is bottomed in its reference position upon the stop 52.

Consequently, when the gear motor 28 is subsequently reversed to establish a gap G at the tip of the slide, the wiper moves in unison with the slide so the resistance between the potentiometer terminals thereafter provides an accurate measure of the width of the gap.

In a practical device it is preferred to have the range of the potentiometer 40 be 270° corresponding to a theoretical throw, at the eccentric, of 180°.

Further in accordance with the invention stops are provided for preventing the slide from proceeding through a displacement equal to the total throw of the eccentric. Specifically, stops are provided for limiting the movement of the slide to correspond to the central 160° of the total theoretical 180° throw of the eccentric to provide the "over-stroke" at each end of the slide movement so that the eccentric cannot swing beyond its two, 180°, dead center positions for any conceivable amount of wear which might occur at the tip of the slide.

The function of the stop in the forward direction of movement is formed by the roller itself. To limit the rearward movement of the slide a backstop 66 is provided (see FIG. 1) aligned in the path of movement of the slide and which may include means (not shown) for adjusting the stop position, that is, the point of movement of the slide where obstruction takes place. As a result, when the slide is driven forward movement will continue until the slide strikes the roller following which slippage will take place before the eccentric reaches its dead center position. Should the slide be retracted by a large amount from the roller, the rear end of the slide will strike the backstop 66, again, before the dead center condition is reached, with the blockage of movement being followed by slippage at the clutch 60. The level of torque, applied to the eccentric, at which slippage at the clutch takes place is preferably sufficiently light so that the force which is applied to the roller by the tip of the slide is sufficient to close the gap to prevent flow without, however, producing any scraping or abrading action between the metal of the slide and the metal of the roller.

To restate the above in slightly different terms, the slide 10, with its associated drive, is located sufficiently close to the roller 12 so that contact between the slide and the roller is certain to occur before the eccentric achieves its dead center position thereby insuring that the eccentric will not move to, or beyond, dead center. Where a back stop 66 is employed, the slide is not only located sufficiently close to the roller so that contact between the tip of the slide and the roller is certain to occur before the eccentric achieves its forward dead center position, but the back stop in the path of rearward movement of the slide is located sufficiently close to the slide so that contact with the back stop is certain to occur before the eccentric achieves its rear dead center position. This insures that the available throw of the eccentric is less than that measured from dead center to dead center.

While it is preferred, for reasons of economy, to employ a single slipping clutch in the disclosed system, it is contemplated that such a clutch may be employed in both of the drive connections, that is, in the drive connection to the slide and in the drive connection to the potentiometer 40, as illustrated in FIG. 4. In the system illustrated in FIG. 4 reference numerals have been applied in accordance with FIG. 1, depending upon the function of the particular element, but with the addition of subscript "a". In this embodiment, the gear motor 28a has a shaft 29a which is directly coupled to the slip clutch 60a which, via eccentric 26a, drives the slide. Mounted upon gear motor shaft 29a is a gear 31a which drives a second gear 33a which is coupled to the potentiometer 40a. Interposed between the gear 33a and the potentiometer, in accordance with one aspect of the present invention, is a second clutch 80 made up of clutch discs 81, 82 having an interposed annulus 83. Bias is provided by a coil spring 84a, with accommodation of axial movement occurring in an adjacent spine connection 85a.

The operation of the embodiment of FIG. 4 is substantially the same as that of FIG. 1: The gear motor 28a is operated in a first direction driving the slide in the direction of the roller, with slippage at the clutch 60a occurring after contact is made. Simultaneously, the wiper of the potentiometer 40a is driven in the direction of the potentiometer stop 52a (FIG. 3) with slippage occurring in the slip clutch 80 once engagement takes place, thereby placing the slide and potentiometer both in their reference positions. Driving the gear motor 28a in the reverse direction causes gradual retraction of the slide to establish a desired gap G accompanied by movement of the wiper along the resistance element, with the amount of resistance being a measure of gap width. Such measure is independent of the amount of wear which, upon passage of time, may have taken place at the tip of the slide. The two-clutch arrangement, shown in FIG. 4, has the advantage that both the slide drive connection and the potentiometer drive connection have means for limiting the reaction torque to the low level at which slippage takes place, while ensuring that both slide and potentiometer are restored to reference condition as an automatic preliminary to adjustment of the gap G for each of the slides of the system.

In the above discussion it has been assumed that some means are provided for "transducing" a value of resistance in the potentiometer to an indication or display in terms of gap width. However, it is one of the features of the present invention that the structure described, in either the single clutch or two-clutch version, is susceptible to automatic remote control, reference being made to the simplified schematic diagram of FIG. 5. The potentiometer 40 associated with the gear train is connected in a follow-up type Wheatstone bridge circuit to a second potentiometer 90 having a control knob 91. The bridge output voltage is fed to an amplifier 92, the amplified output, of either forward or reverse polarity, being applied to the winding of the gear motor 28. The latter drives the slide via slip clutch 60 as well as driving the wiper 42 of potentiometer 40, through the optional slip clutch 80.

In operation, turning the knob 91 in the "minimum" gap direction energizes the motor 28 to turn in a direction to drive both the slide and wiper into their reference positions. It will be apparent to one skilled in the art that the circuit may be adjusted to ensure that slippage occurs in the clutch, or clutches, of the system; for example, this may be accomplished by a pushbutton 93 which couples the motor winding to a source of auxiliary voltage. In any event, after slippage occurs, and the motor is de-energized, both the slide and potentiometer will be in reference position. Consequently, when the knob 91 is turned with respect to a calibrated scale to produce the desired gap width G, the bridge circuit energizes the motor to drive the potentiometer and slide in unison, opening the gap. When the gap is open to the set amount, the output voltage from the bridge circuit becomes zero and the motor comes to a stop. Thus the calibration is preserved in spite of wear. Subsequently, the knob 91 may be adjusted upwardly or downwardly from the initially set value free of slippage at the clutch or clutches.

Above it has been stated that the slides, for example the slide 10, occupy respective "column positions". By this is meant that the slides span respective increments along the length dimension of the fountain roller which preferably, but not necessarily, correspond to the columns in the printed product.

We claim:

1. An ink metering arrangement including a fountain roller having a plurality of slides arranged edge-to-edge in respective column positions; the slides taken together extending the length of the fountain roller with each slide being adjustable so that its tip forms a gap with the roller thereby determining the rate of ink flow in the respective column position; each slide having a reversible motor with a first connection thereto for driving the slide over a limited range of movement including a slide reference position in which the gap is zero cutting off the flow, displacement sensing means having a second connection to the motor for producing an electrical output signal corresponding to the degree of displacement, means defining a stop for the displacement sensing means to establish a reference output condition, and means including a slip clutch interposed in at least one of said connections to said reversible motor so that when the motor is energized in a first direction the displacement sensing means is driven in the direction of the reference position against its stop and the slide is driven in the direction of its reference position against the roller so that both the slide and displacement sensing means are fully moved to their reference positions accompanied by relative slipping movement of the clutch notwithstanding the fact that the tip of the slide may have been shortened by wear against the roller and so that upon reversal of the motor the displacement sensing means thereafter provides an accurate measure of the opening at the gap.

2. An ink metering arrangement including a fountain roller having associated therewith a plurality of slides arranged edge-to-edge in respective column positions; the slides taken together extending the length of the fountain roller with each slide being adjustable so that its tip forms a gap with the roller thereby determining the rate of ink flow in the respective column position; each slide having a reversible motor with a first connection thereto for driving the slide over a limited range of movement including a slide reference position in which the gap is zero cutting off the flow in the column position, displacement sensing means having a second connection to the motor for producing an electrical output corresponding to the degree of displacement, means defining a stop for the displacement sensing means to establish a reference output condition, means including a slip clutch interposed in each of said first and second connections to said motor so that when the motor is energized in a first direction the displacement sensing means is driven in the direction of its reference position against its stop and the slide is driven in the direction of its reference position against the roller and so that both the slide and the displacement means freely move to their reference positions accompanied by relative slipping movement at the clutches notwithstanding the fact that the tip of the slide may have been shortened by wear against the roller so that upon reversal of the motor the displacement sensing means thereafter provides an accurate measure of the opening at the gap.

3. An ink metering arrangement including a fountain roller having a plurality of slides arranged edge-to-edge in respective column positions; the slides taken together extending the length of the fountain roller with each slide being adjustable so that its tip forms a gap with the roller thereby determining the rate of ink flow in the respective column position; each slide having a reversible motor with a first connection thereto for driving the slide over a limited range of movement including a slide reference position in which the gap is zero cutting off the flow, displacement sensing means having a second connection to the motor for producing an electrical output signal corresponding to the degree of displacement, means defining a stop for the displacement sensing means to establish a reference output condition, and means including a slip clutch interposed in said first connection to said motor so that when the motor is energized in a first direction both the displacement sensing means and the slide are fully moved to their respective reference positions accommodated by relative slipping movement of the clutch notwithstanding the fact that the tip of the slide may have been relatively shortened by wear against the roller so that upon reversal of the motor the displacement sensing means thereafter provides an accurate measure of the opening at the gap.

4. The combination as claimed in claim 1 or in claim 2 or in claim 3 in which the displacement sensing means is in the form of a variable resistor with remote means responsive to the resistance for constantly indicating the width of the gap.

5. The combination as claimed in claim 1 or in claim 2 or in claim 3 in which the displacement sensing means is in the form of a potentiometer, a manually adjustable potentiometer calibrated in terms of gap width, the two potentiometers being connected in a follow-up circuit so that the motor tends to drive the connected slide to form a gap with the roller corresponding to the setting of the manually adjusted potentiometer.

6. The combination as claimed in claim 1 or in claim 2 or in claim 3 in which said first connection to said motor for driving the slide includes an eccentric having a dead center position, the slide being located sufficiently close to the roller that contact between the slide and the roller is certain to occur before the eccentric achieves its dead center position thereby insuring that the eccentric will not move to dead center.

7. The combination as claimed in claim 1 or in claim 2 or in claim 3 in which said first connection to said motor for driving the slide includes an eccentric having forward and rear dead center positions at 180° from one another, the slide being located sufficiently close to the roller that contact between the tip of the slide and the roller is certain to occur before the eccentric achieves its forward dead center position, and a back stop in the path of rearward movement of the slide located sufficiently close to the slide that contact with the back stop is certain to occur before the eccentric achieves its rear dead center position thereby insuring that the throw of the eccentric is restricted by the stop action of the roller and the back stop to be less than its maximum throw measured from dead center to dead center.

8. A method of adjusting an ink fountain of the kind having a fountain roller and a plurality of slides arranged edge-to-ege in respective column positions along the axial length of said roller; each slide being adjustable so that its tip forms a gap with the roller thereby determining the rate of ink flow in the respective column position; each slide having:

a reversible motor with a mechanical connection thereto for driving the slide over a limited range of movement including a slide reference position in which the gap is zero cutting off the flow and a slide back stop position in which the gap is a maximum, said mechanical connection having a slip clutch for limiting the force transmitted from said motor to said slide when said motor drives said slide forward to said slide reference position and reverse to said back stop position, and displacement sensing means for producing an electrical output signal corresponding to the degree of displacement of said motor and including means for defining a reference output condition, said reference output condition being established for a predetermined degree of displacement of said motor exceeding the displacement of said motor sufficient to drive said slide forward from said back stop position to said slide reference position, wherein said method comprises the steps of:

(1) energizing said motor to drive said slide in the reverse direction to said back stop position so that said slip clutch limits the transmitted force by slipping, and (2) thereafter energizing said motor to drive said slide in the forward direction until said displacement sensing means produces said reference output condition, whereby said slide in the interim is driven to said slide reference position and said slip clutch slips to limit the force transmitted from said motor to the slide and hence from the slide to the fountain roller, and thereby said reference output condition is indicated when said slide is in said slide reference position so that said displacement sensing means thereafter indicates the position of said slide with respect to said slide reference position when said slide is driven in a reverse direction by said motor.

9. The method according to claim 8 wherein said displacement sensing means is a potentiometer, and said reference output condition is defined by a mechanical stop.

* * * * *